United States Patent [19]
Buckley et al.

[11] Patent Number: 5,529,150
[45] Date of Patent: Jun. 25, 1996

[54] PARKING BRAKE

[75] Inventors: James A. Buckley, Whitefish Bay; Curt H. Blaszczyk, Sturtevant, both of Wis.

[73] Assignee: Hayes Industrial Brake, Inc., Mequon, Wis.

[21] Appl. No.: 441,961

[22] Filed: May 16, 1995

[51] Int. Cl.⁶ .................................................. F16D 65/56
[52] U.S. Cl. ................... 188/72.9; 188/72.7; 188/196 D
[58] Field of Search .................. 188/71.7, 71.8, 188/71.9, 72.1, 72.7, 72.8, 72.9, 106 F, 196, 196 D, 79.55; 475/206; 277/208

[56] References Cited

U.S. PATENT DOCUMENTS

| | | | |
|---|---|---|---|
| 3,730,302 | 5/1973 | Ogawa et al. | 188/73.37 |
| 3,885,651 | 5/1975 | Odier | 188/73.37 |
| 4,051,927 | 10/1977 | Karasudani | 188/73.44 |
| 4,144,952 | 3/1979 | Nakayama | 188/73.45 |
| 4,964,490 | 10/1990 | Watanabe | 188/73.44 |
| 5,060,765 | 10/1991 | Meyer | 188/196 D |
| 5,195,386 | 3/1993 | Havens et al. | 188/72.9 |

*Primary Examiner*—Robert J. Oberleitner
*Assistant Examiner*—Chris Schwartz
*Attorney, Agent, or Firm*—Foley & Lardner

[57] ABSTRACT

A heavy duty caliper brake assembly mounted in a position to engage a brake disc, the caliper including means for supporting the caliper on the housing, a brake pad mounted on the caliper on each side of the disc, a rotor mounted on one leg of the caliper in a position to engage one of the brake pads and a ball ramp assembly positioned between the caliper and the rotor for moving one of the brake pads into engagement with the brake disc on rotation of the rotor with respect to the caliper.

3 Claims, 4 Drawing Sheets

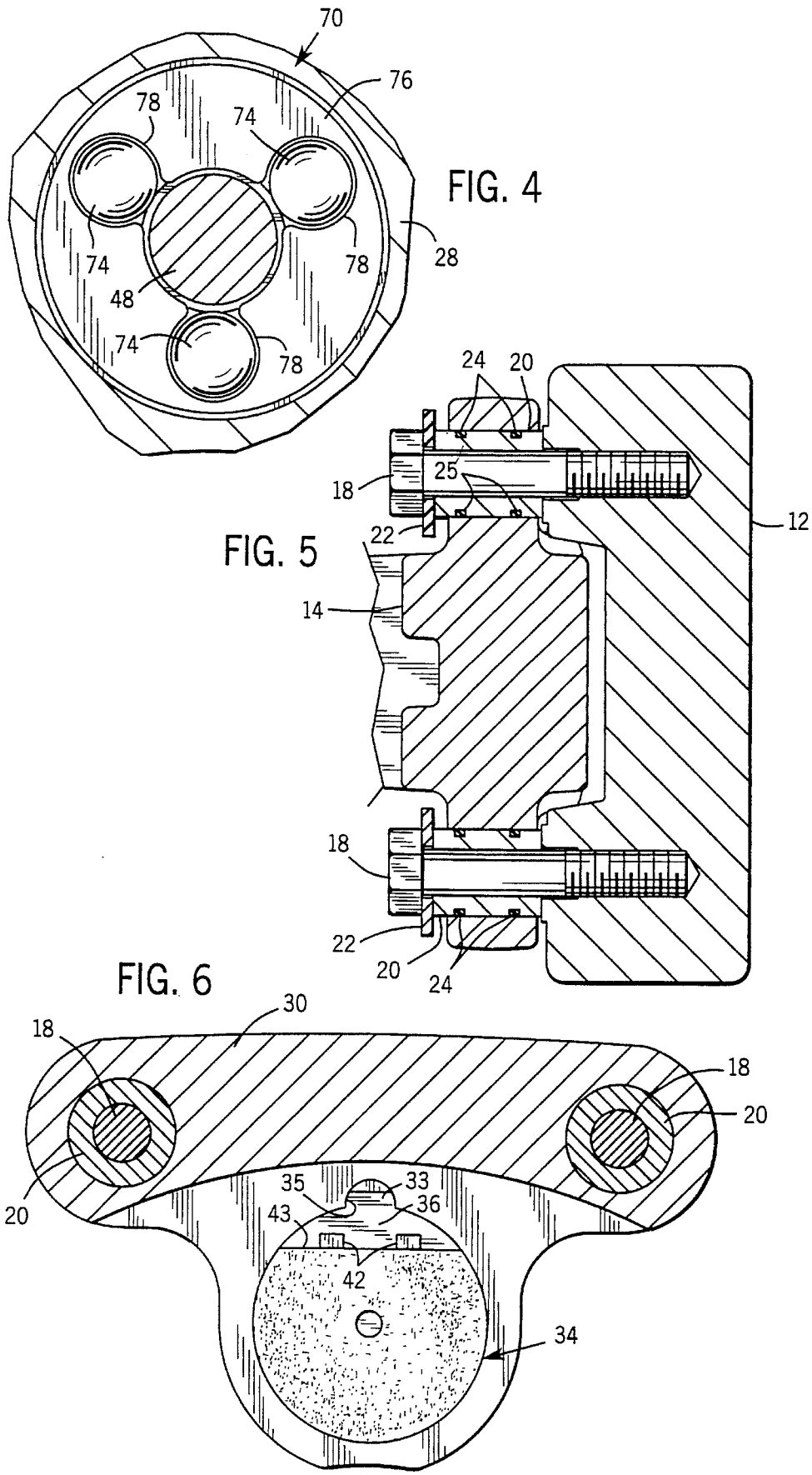

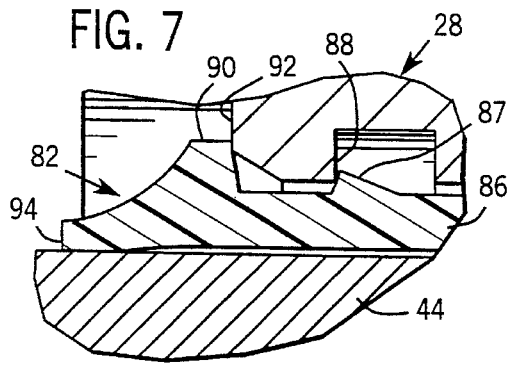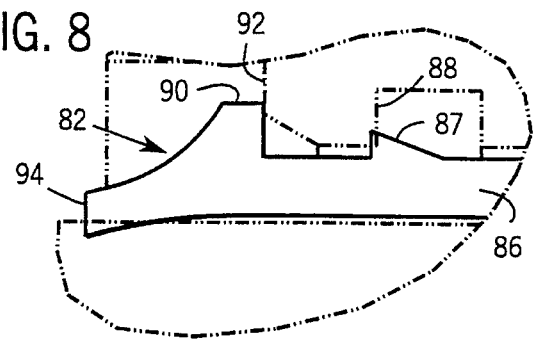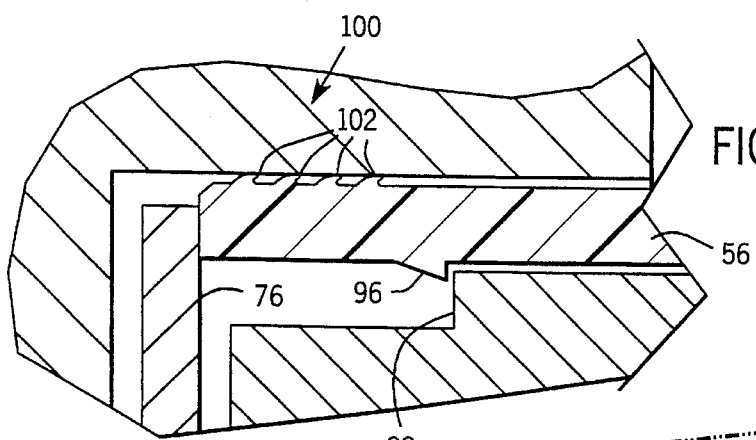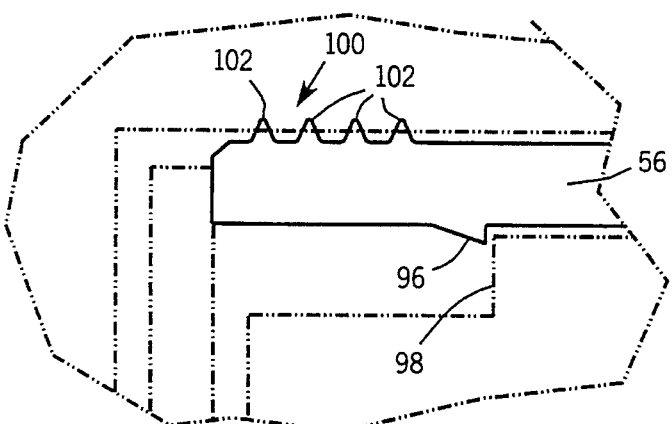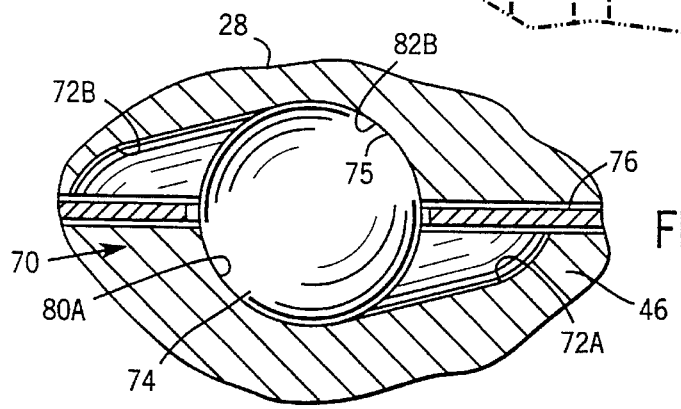

PARKING BRAKE

FIELD OF THE INVENTION

The present invention relates to floating type caliper brakes and more particularly to a high torque lever actuated parking brake caliper.

BACKGROUND OF THE INVENTION

Parking brakes for heavy duty construction and off road equipment have been relatively expensive. This was due to the elaborate mounting structures required which were both expensive, lacked durability and corrosion resistance. These previous designs, except for the very high and expensive ones, have also lacked environmental and corrosion protection in their actuation mechanism.

SUMMARY OF THE PRESENT INVENTION

The present invention relates to a high torque lever actuated disc brake having a floating caliper housing for supporting a brake pad on each side of the brake disc, and to a ball type actuator for moving the brake pads into engagement with the disc.

The park brake presented here utilizes a novel, heavy duty, fully sealed mounting assembly, centered over the brake disc, that when mounted onto the vehicle's transmission eliminates the problems associated with previous designs as well as negating deflections, all at a major cost reduction to the customer.

This brake design cleverly seals and protects the functional mechanism in very low cost fashion. This design also innovates the fabrication of the friction material by using an integral reinforcing structure while eliminating extra parts or expensive attachment methods. The long term durability of this design comes from both its sealing system as well as its use of proven ball and ramp technology.

A primary feature of the invention is the provision of a park brake having a one piece rotor with a number of constant angle ball ramps wherein each ramp includes a back stop to prevent actuation in the off position.

A further feature of the invention is the use of a one piece rotor having constant angle ball ramps equally spaced around one face of the rotor for supporting a corresponding number of balls for moving the brake pads into engagement with a brake disc.

A further feature of the invention is the use of a plastic cap to seal the ball ramp mechanism and thereby prolong the life of the mechanism and preserve its high efficiency.

A further feature of the invention is the provision of a sealed mount for supporting the floating caliper and more particularly to a sealed mount which is mounted directly over the brake disc thereby providing for a minimum of flexure of the sealed mount.

Another feature of the invention relates to a ball ramp rotor having a back stop in each ball ramp to establish the off point at installation simplifying the linkage set up.

Another feature of the invention is the use of a ball spacer which maintains squareness, efficiency and durability of the device by maintaining equal angular ball spacing in all adjustment positions.

A further feature of the invention is the use of one piece brake pads formed from a fiberglass phenolic friction material having a fiber backing thereby eliminating the use of any bonding or rivets.

Another feature of the invention is the use of "D" shaped brake pads which prevent rotation of the brake pads.

Other principal features and advantages of the invention will become apparent to those skilled in the art upon review of the following drawings, the detailed description and the appended claims.

BRIEF DESCRIPTION OF THE DRAWINGS

FIG. 4 is a view taken on line 4—4 of FIG. 2;

FIG. 5 is a cross section view taken on line 5—5 of FIG. 1;

FIG. 6 is a cross section view taken on line 6—6 of FIG. 2;

FIG. 7 is a cross section view of the shaft seal;

FIG. 8 is a cross section view of the shaft seal with the shaft and housing shown in phantom;

FIG. 9 is a cross section view of the rotor seal formed on the end of the cap;

FIG. 10 is an enlarged view of the rotor seal on the cap shown in phantom; and

FIG. 11 is a section view of one of the balls shown in one of the ramps and retained therein by the ball spacer.

Figure 1:
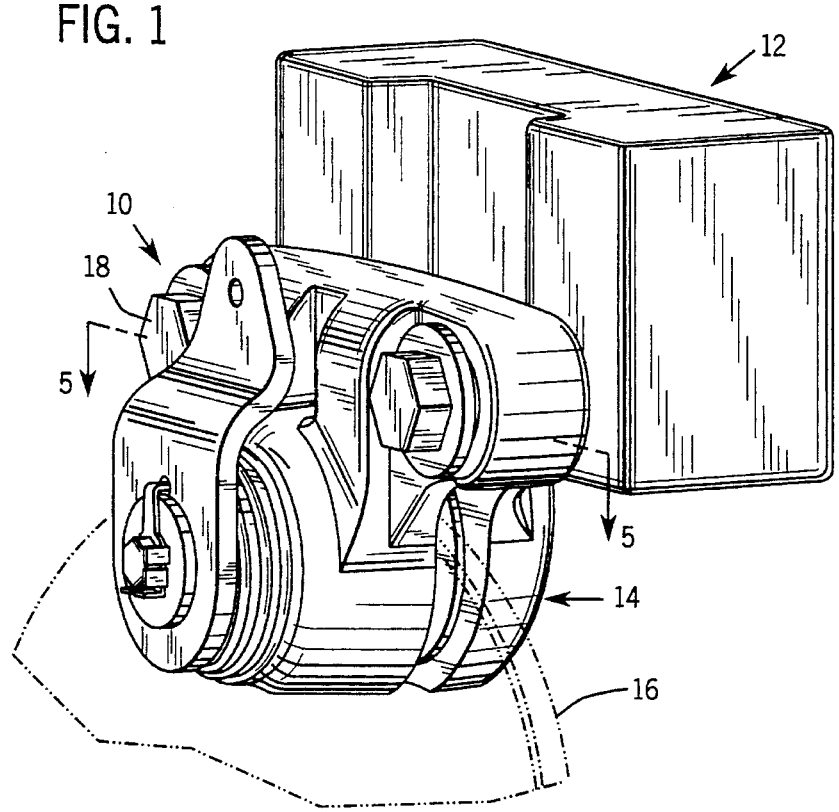
FIG. 1 is a perspective view of the brake assembly shown mounted on a transmission housing.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 3:
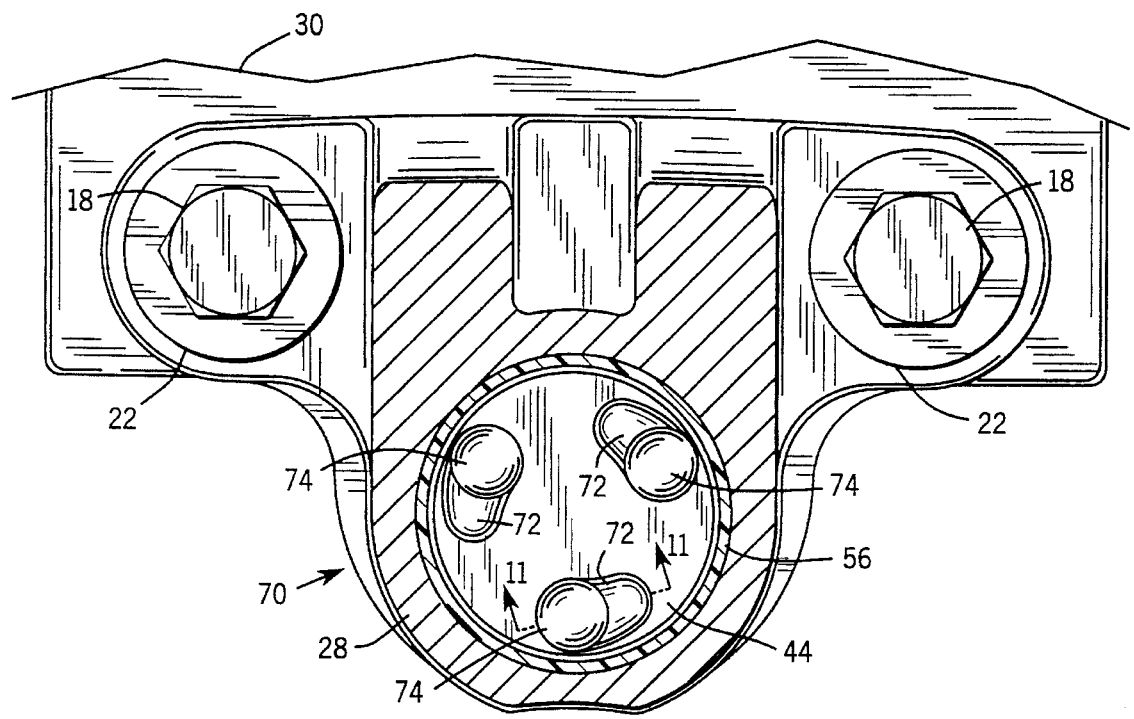
FIG. 3 is a view taken on line 3—3 of FIG. 2.

The caliper disc brake 10 according to the present invention and as shown in FIGS. 1, 3 and 5 is shown mounted on a transmission housing 12. The disc brake generally includes a U-shaped caliper 14 which is positioned to bridge a rotary disc 16. The caliper 14 as shown in FIGS. 1 and 5 is mounted on the transmission housing 12 by means of a pair of screws 18 having a bushing 20 and a washer 22 mounted on each of the screws 18. The bushings are coated with a dry lubricant such as PTFE or graphite which lubricates and protects the bushing from corrosion. A pair of 0-ring seals 24 may be provided in either the caliper or the bushing such that the caliper is free to move with respect to the bushing 20.

Figure 2:
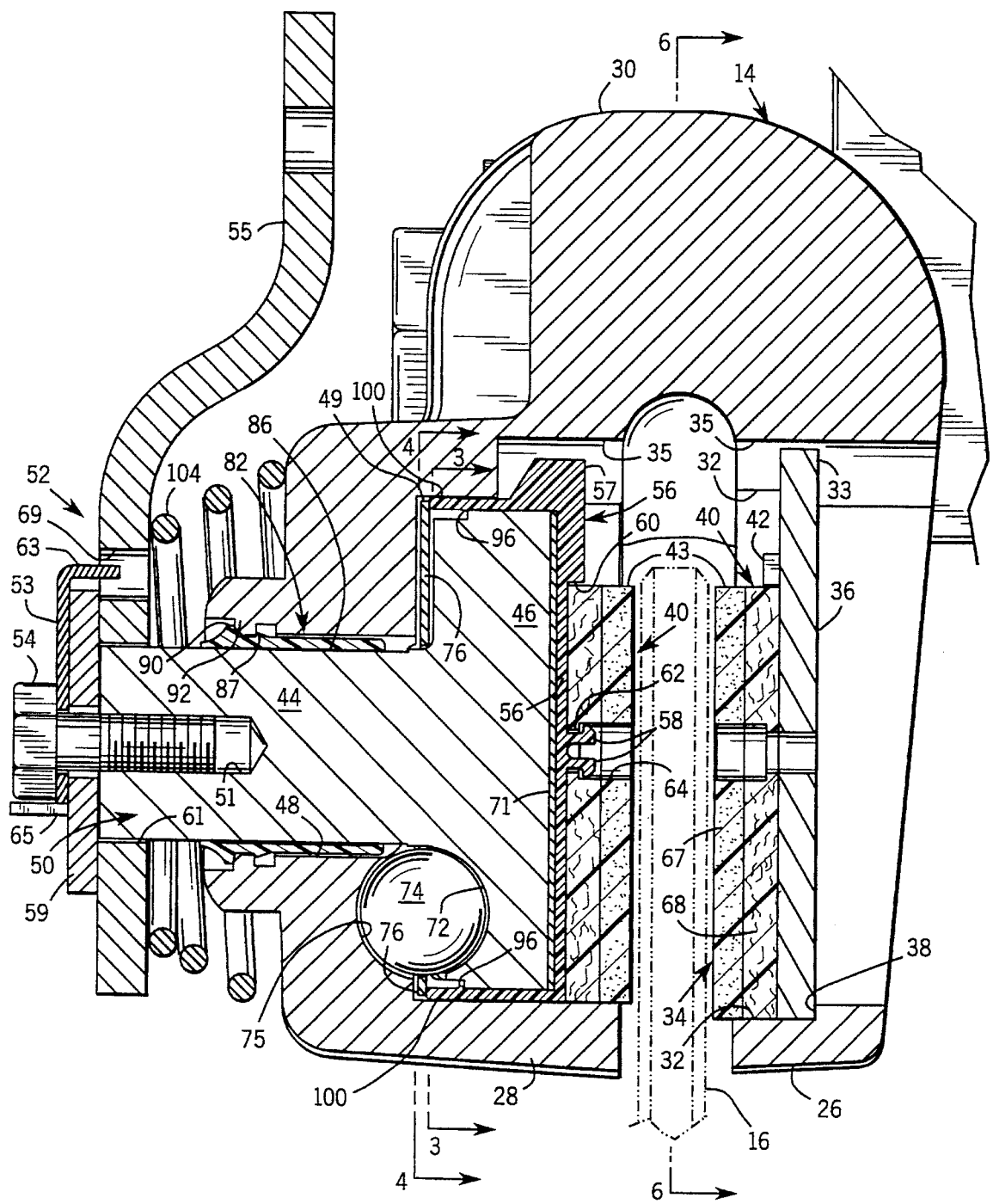
FIG. 2 is a cross section view of the brake assembly showing the rotor mount and friction pads.

A cross section of caliper 14 is shown in FIG. 2. The caliper 14 includes a leg 26 on the inboard side of the disc 16 and a leg 28 on the outboard side of disc 16 which are interconnected by a bridge section 30. The inboard leg 26 includes an opening 38 having a recess 32 around the perimeter of the opening 38 and a notch 35 at the upper end of the opening. A brake pad assembly 34 is mounted in the recess 32 in a position to engage the disc 16. The brake pad assembly 34 includes a backing plate 36 and a brake pad 40 mounted on the inside of plate 36. The backing plate 36 is seated in the recess 32. A tab 33 is provided at the top of the plate 36 which is aligned with notch 35 in the bridge section 30 to prevent rotation of the backing plate 36. A pair of stops 42 are provided on the face of the backing plate 36 as shown in FIG. 6. The brake pad 40 is seated in the opening 32 in abutting relation to the backing plate 36. A flat surface 43 is provided across the top of the friction pad 40 which engages the stops 42 on the top to prevent rotation of the assembly 34.

A rotor 50 is mounted in the outboard leg 28 as shown in FIG. 2. The rotor 50 includes a shaft 44 and a head 46. The shaft 44 is aligned with a bore 48 in the leg 28 and the head 46 is aligned in a bore 49 in the leg 28. A lever assembly 52 is secured to the end of the shaft 44 by means of a bolt 54 which is screwed into a threaded opening 51 in the shaft 44. The lever assembly 52 includes a lever 55, a bolt keeper 53, and a washer 59. The lever 55 includes a splined opening 61 and is bent to overlie the center of the rotor seal 82. The bolt keeper 53 is mounted on the bolt 54 to prevent rotation of bolt 54. In this regard the bolt keeper 53 includes a tab 63 which is aligned with an opening 69 in lever 55. The bolt keeper also includes two pairs of tabs 65 one of which is bent into engagement with the head of bolt 54 to prevent rotation after mounting the bolt in the threaded opening 51. A 500 lb. input on a 4 inch hole center provides about 9000 lb. clamping force.

A plastic cap 56 is mounted on the head 46 of the rotor 50. The cap 56 includes a tab 57 which is aligned with the notch 35 in the bridge section to prevent rotation of the cap 56. A thrust washer 71 may be positioned between the cap 56 and the face of the head 46. A ledge 60 is provided across the face of the cap 56. A friction pad 40 is secured to the face of cap 56 by means of a pair of tabs 58 which matingly engage a shoulder 62 provided at the end of an opening 64 in the pad 40. The flat surface 43 of the pad 40 abuts the ledge 60 to prevent rotation of the pad 40.

The friction pads 40 may be identical in configuration and in composition. In this regard, the pads 40 are made of a fiberglass phenolic material 67 which is fully supported on a fiber backing 68, the backing being many times as strong as the friction material eliminating the need for a steel backing plate. Adjustment for pad wear may be accomplished by shortening the cable or linkage connected to the lever 55 and/or repositioning of the lever 55 to the next tooth of a spline provided on the end of shaft 44. In this regard, the spline is not shown, however, it may be provided on the end of shaft 44. The lever 53 would also include a corresponding spline opening which would matingly engage the spline on the end of shaft 44. The lever would be removed from the shaft 44 by backing off the bolt 54 and resetting the lever to the next spline tooth.

The rotor 50 is moved axially in the opening 48 on rotation of the lever assembly 52 by means of a ball ramp assembly 70 provided between the rotor 50 and the outboard leg 28 as shown in FIGS. 2, 3, 4 and 11. The ball ramp assembly 70 includes three constant angle ramps 72A provided in the back of the head 46 of the rotor 50 and three constant angle ramps 72B in leg 28. A corresponding number of ball pockets 75 are provided in the leg 28 and in the head 46. A ball 74 is seated in each of the pockets 75 in alignment with the ramps 72A and 72B. A ball retainer or spacer 76, as shown in FIG. 4, is provided with three openings 78 which keep the balls 120° apart. This is significant in maintaining equilibrium when the balls are moved between the on and off positions. A backstop 80A is provided at the end of each ball ramp 72A to establish the off point on installation and preventing inadvertent movement in the reverse direction. The ball retainer allows the rotor home position to be other than fully against the back stop 80 while keeping the proper angular position of the balls 74 to their mating pockets after linkage adjustment for pad wear has occurred.

The ball ramp assembly 70 is sealed in the leg 28 by means of a rotor seal 82 mounted in the bore 48 and a crush seal 100 provided on the cap 56. Referring to FIGS. 2, 7 and 8, the rotor seal 82 is in the form of a sleeve 86 formed from plastic material which has a diameter slightly greater than the diameter of the shaft 44 except at opening 94. The seal 82 as shown in FIGS. 7 and 8 includes a first rib 87 which is aligned with the inner edge 88 of a flange 92 provided in bore 48. A second flange 90 is positioned to engage the outer edge of flange 92 to retain the rotor seal 82 in position. It should be noted in FIG. 8 that the opening 94 at the end of the rotor seal 82 is smaller than the diameter of the shaft 44 creating an interference type seal. On assembly of the shaft 44 through the rotor seal 82, the opening 94 will expand as shown in FIG. 7 to physically engage the shaft 44.

The seal formed by the plastic cap 56, as shown in FIGS. 9 and 10, includes a retaining ring 96 formed on the inner surface of the cap 56 in a position to engage a shoulder 98 provided on the head 46. A crush seal 100 in the form of a number of flanges 102 is provided on the outer surface of the cap 56 as shown in FIG. 10. The flanges 102 are crushed as shown in FIG. 9 when the cap 56 is inserted into the recess 49 in the outboard leg 28. A spring 104 may be provided between the leg 28 and the lever 55 to bias the rotor 50 to the inoperable position.

Thus, it should be apparent that there has been provided in accordance with the present invention a parking brake that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A heavy duty caliper brake assembly adapted to be mounted on a housing in a position to engage a brake disc, said assembly comprising:

a caliper, means for supporting said caliper on the housing in a position to bridge the disc, a brake pad mounted in said caliper on each side of the disc, a rotor mounted on one side of said caliper in a position to engage one of said brake pads, and a ball/ramp assembly positioned between said caliper and said rotor for moving said one of said brake pads into engagement with the brake disc on rotation of said rotor with respect to said caliper, said ball/ramp assembly including a number of constant angle ramps formed in said rotor and an equal number of ramps formed in said caliper, a ball positioned between each pair of ramps in said rotor and said caliper whereby said brake pads are moved into and out of engagement with the disc on rotation of said rotor with respect to said caliper, and a ball retainer positioned between said rotor and said caliper for maintaining a fixed distance between said balls.

2. A heavy duty caliper brake assembly adapted to be mounted on a housing in a position to engage a brake disc, the assembly comprising a caliper, means for supporting said caliper on the housing in a position to bridge the disc, a brake pad mounted in said caliper on each side of the disc, a rotor mounted on one side of the caliper in a position to engage one of the brake pads, a ball/ramp assembly positioned between the caliper and the rotor for moving one of the brake pads into engagement with the brake disc on rotation of the rotor with respect to the caliper, wherein said rotor includes a shaft having a head at one end, a number of ramps equally spaced around one side of said head, and a number of balls corresponding to the number of ramps mounted in the caliper in alignment with said ramps and a cap mounted on said head, a crush seal formed on said cap including for sealing the space between the head of the rotor and the caliper and means mounted on the shaft for sealing the space between the caliper and the shaft of the rotor.

3. The brake assembly according to claim 2 including a ball retainer for maintaining equal spacing of said balls around the head of the rotor.

* * * * *